(12) United States Patent
Yoon et al.

(10) Patent No.: US 10,422,371 B2
(45) Date of Patent: Sep. 24, 2019

(54) HYBRID PROPELLER SHAFT FOR VEHICLE

(71) Applicant: Hyundai Motor Company, Seoul (KR)

(72) Inventors: Sang Jae Yoon, Daejeon (KR); Sung Su Yoo, Hwaseong-si (KR); Chi Hoon Choi, Suwon-si (KR); Sang Yoon Park, Daejeon (KR); Dong Jun Lee, Suwon-si (KR); Jeong Min Cho, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 166 days.

(21) Appl. No.: 15/380,872

(22) Filed: Dec. 15, 2016

(65) Prior Publication Data

US 2018/0058496 A1    Mar. 1, 2018

(30) Foreign Application Priority Data

Aug. 31, 2016    (KR) .................. 10-2016-0111591

(51) Int. Cl.
*F16C 3/02* (2006.01)
*B29C 70/00* (2006.01)
*B29C 65/48* (2006.01)
*B29L 31/00* (2006.01)
*B29C 65/00* (2006.01)

(52) U.S. Cl.
CPC .............. *F16C 3/026* (2013.01); *B29C 70/00* (2013.01); *B29C 65/48* (2013.01); *B29C 66/534* (2013.01); *B29C 66/71* (2013.01); *B29C 66/723* (2013.01); *B29C 66/729* (2013.01); *B29C 66/7212* (2013.01); *B29C 66/742* (2013.01); *B29L 2031/75* (2013.01); *F16C 2326/06* (2013.01)

(58) Field of Classification Search
CPC ...... F16C 3/026; F16C 2326/06; B29C 65/48; B29L 2031/75
USPC .................................................. 464/181, 183
See application file for complete search history.

(56) References Cited

U.S. PATENT DOCUMENTS

| 4,573,745 | A | * | 3/1986 | Fujisaki | .................. B60B 1/003 |
| 5,236,018 | A | * | 8/1993 | Kobayashi | ............ B29C 53/585 |
| 5,601,493 | A | * | 2/1997 | Nakazono | ............... F16C 3/026 |
| | | | | | 464/181 |
| 2015/0345541 | A1 | | 12/2015 | Sonnen et al. | |

FOREIGN PATENT DOCUMENTS

| JP | 2001-032819 | 2/2001 |
| JP | 3370977 B2 | 1/2003 |
| JP | 2007-196684 | 8/2007 |
| KR | 10-0515800 | 9/2005 |
| KR | 10-2008-0012559 A | 2/2008 |
| KR | 10-2011-0051988 A | 5/2011 |

* cited by examiner

*Primary Examiner* — Greg Binda
(74) *Attorney, Agent, or Firm* — Morgan, Lewis & Bockius LLP

(57) ABSTRACT

A hybrid propeller shaft may include a CFRP tube layer in which high-strength CFRP or high-elasticity CFRP, the high-strength CFRP, and the high-elasticity CFRP are laminated to form at least two layers while having different wrapping angles by a prepreg wrapping process method; and a protective layer which is formed on an outermost layer of the CFRP tube layer to protect the CFRP tube layer.

4 Claims, 7 Drawing Sheets

HYBRID PROPELLER SHAFT FOR VEHICLE

CROSS-REFERENCE TO RELATED APPLICATION

The present application claims priority to Korean Patent Application No. 10-2016-0111591 filed on Aug. 31, 2016, the entire contents of which is incorporated herein for all purposes by this reference.

BACKGROUND

Field of the Invention

The present invention relates to a hybrid propeller shaft for a vehicle. More particularly, it relates to a hybrid propeller shaft for a vehicle, which is formed by using a prepreg wrapping process method in order to maximize the critical number of revolutions of the propeller shaft and implement a weight reduction.

Description of Related Art

Recently, developments on high-performance vehicles having excellent driving performance have been progressively conducted, and most of the high-performance vehicle models are designed as rear wheel drive vehicles in order to improve handling and motion performance.

For the purpose of the rear wheel drive, a propeller shaft for transmitting power from a transmission to a differential gear is essentially required, and because high rotational force and torsion are applied to the propeller shaft when the power is transmitted, it is important to select materials that may withstand high rotational force and torsion.

In comparison with a propeller shaft for a typical mass-produced vehicle, the propeller shaft for a high-performance vehicle not only needs to withstand a high rotational speed, a high torsion environment, and a severe driving environment, but also needs to be reduced in weight in order to improve vehicle responsiveness and rotational inertia, and as a result, a propeller shaft including a high-rigidity composite material is adopted.

In order to configure the propeller shaft by using the composite material as described above, laminating design, which is made in consideration of properties of materials, is very important. The reason is that wrong laminating design may cause the breakdown of components due to resonance and a lack of torsional rigidity in the case of the critical number of revolutions.

The critical number of revolutions is the most important factor that is considered to prevent resonance when designing the propeller shaft, and is usually calculated by natural frequency (Hz)×60.

However, the natural frequency is inversely proportional to the square of a length, and tends to be decreased depending on an assembling condition of yoke units that are assembled to both ends of the propeller shaft, and as a result, there is a limitation in maximizing the critical number of revolutions.

Meanwhile, because the propeller shaft including the composite material in the related art is manufactured based on a filament winding process method, and because there is a limitation to a minimum winding angle (10° or less in a longitudinal direction) of the fiber in the case of the filament winding process method, there is a disadvantage in that free laminating design for maximizing the natural frequency cannot be implemented. In addition, when the propeller shaft is manufactured by using the filament winding process method, bubbles and defects easily occur due to the nature of the process method, which causes deterioration in performance of the propeller shaft.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a propeller shaft for a vehicle, which is capable of maximizing the natural frequency and the critical number of revolutions of the propeller shaft and implementing a weight reduction, by laminating a carbon fiber reinforced plastic material by using a prepreg wrapping process method.

Various aspects of the present invention are directed to providing a hybrid propeller shaft for a vehicle, the hybrid propeller shaft including: a CFRP (Carbon Fiber Reinforced Plastic) tube layer in which high-strength CFRP (Carbon Fiber Reinforced Plastic) or high-elasticity CFRP (Carbon Fiber Reinforced Plastic), the high-strength CFRP, and the high-elasticity CFRP are laminated to form two or more layers while having different wrapping angles by a prepreg wrapping process method; and a protective layer which is formed on an outermost layer of the CFRP tube layer to protect the CFRP tube layer.

In an exemplary embodiment, the CFRP tube layer may include an inside layer which is formed by wrapping the high-elasticity CFRP at 45° by using the prepreg wrapping process method, and an outside layer which is formed by wrapping the high-elasticity CFRP, which is the same material, at 0° around an outside surface of the inside layer by using the prepreg wrapping process method again, and a thickness ratio between the outside layer and the inside layer may be determined as 70%:30%.

In another exemplary embodiment, the CFRP tube layer may include an inside layer which is formed by wrapping the high-strength CFRP at 45° by using the prepreg wrapping process method, and an outside layer which is formed by wrapping the high-strength CFRP, which is the same material, at 0° around an outside surface of the inside layer by using the prepreg wrapping process method again, and a thickness ratio between the outside layer and the inside layer may be determined as 70%:30%.

In still another exemplary embodiment, the CFRP tube layer may include an inside layer which is formed by wrapping the high-strength CFRP at 45° by using the prepreg wrapping process method, a first outside layer which is formed by wrapping the high-strength CFRP, which is the same material, at 0° around an outside surface of the inside layer by using the prepreg wrapping process method again, and a second outside layer which is formed by wrapping the high-elasticity CFRP at 0° around an outside surface of the first outside layer by using the prepreg wrapping process method again, and a thickness ratio among the second outside layer, the first outside layer, and the inside layer may be determined as 50%:20%:30%.

In yet another exemplary embodiment, the CFRP tube layer may include an inside layer which is formed by wrapping the high-strength CFRP at 45° by using the prepreg wrapping process method, and first to fifth outside layers which are formed by sequentially wrapping the high-elasticity CFRP and the high-strength CFRP at 0° around an outside surface of the inside layer by using the prepreg wrapping process method again, a thickness of the high-strength CFRP, which forms the inside layer, may be determined as 30% of an overall thickness, a thickness of the high-strength CFRP, which forms the second and fourth outside layers, may be determined as 20% of the overall thickness, and a thickness of the high-elasticity CFRP, which forms the remaining first, third, and fifth outside layers, may be determined as 50% of the overall thickness.

In still yet another exemplary embodiment, the protective layer may be configured as a fabric layer formed by fiberizing polyphenylene sulfide (PPS) which is a kind of thermoplastic super engineering plastic.

In a further exemplary embodiment, metal yokes may be press-fitted into and fastened to both end portions of the CFRP tube layer by splines.

In another further exemplary embodiment, CFRP wrapping may be further performed two times as much as a tube thickness at both end portions of the CFRP tube layer to prevent damage to the tube layer caused by press-fitting force of the metal yokes which are press-fitted into the both end portions of the CFRP tube layer.

Through the aforementioned technical solutions, various aspects of the present invention are directed to providing the effects below.

Various aspects of the present invention are directed to providing a propeller shaft including: a CFRP tube layer in which high-strength CFRP or high-elasticity CFRP, the high-strength CFRP, and the high-elasticity CFRP are laminated to form two or more layers while having different wrapping angles by a prepreg wrapping process method; and the protective layer which protects the CFRP tube layer, maximizing the natural frequency and the critical number of revolutions of the propeller shaft and implementing a weight reduction.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuel derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
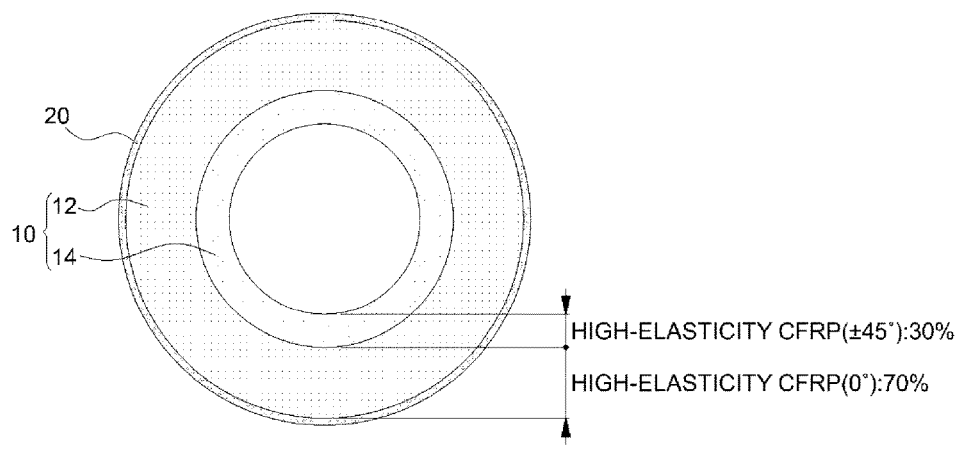
FIG. 1 is a cross-sectional view illustrating a propeller shaft according to various exemplary embodiments of the present invention.

Reference numerals set forth in the Drawings include reference to the following elements as further discussed below:

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described in more detail with reference to the accompanying drawings.

A propeller shaft according to an exemplary embodiment of the present invention includes a CFRP tube layer which is formed by laminating two or more layers of a carbon fiber reinforced plastic (hereinafter, referred to as CFRP) material by using a prepreg wrapping process method to maximize the natural frequency and the critical number of revolutions, and a protective layer which is formed on an outermost layer of the CFRP tube layer to protect the CFRP tube layer.

The propeller shaft according to an exemplary embodiment of the present invention may be appropriately manufactured such that an overall length is 1,200 mm, an outer diameter of the CFRP tube layer is 80 mm, and a thickness is 3 mm.

The CFRP tube layer is configured by laminating two or more layers of the CFRP having different wrapping angles by the prepreg wrapping process method.

In more, the CFRP tube layer includes two laminated layers including an outside layer and an inside layer, in which the outside layer is formed by wrapping the CFRP at 0° to increase the natural frequency, and the inside layer is formed by wrapping the CFRP at 45° to increase torsional rigidity.

Figure 13:
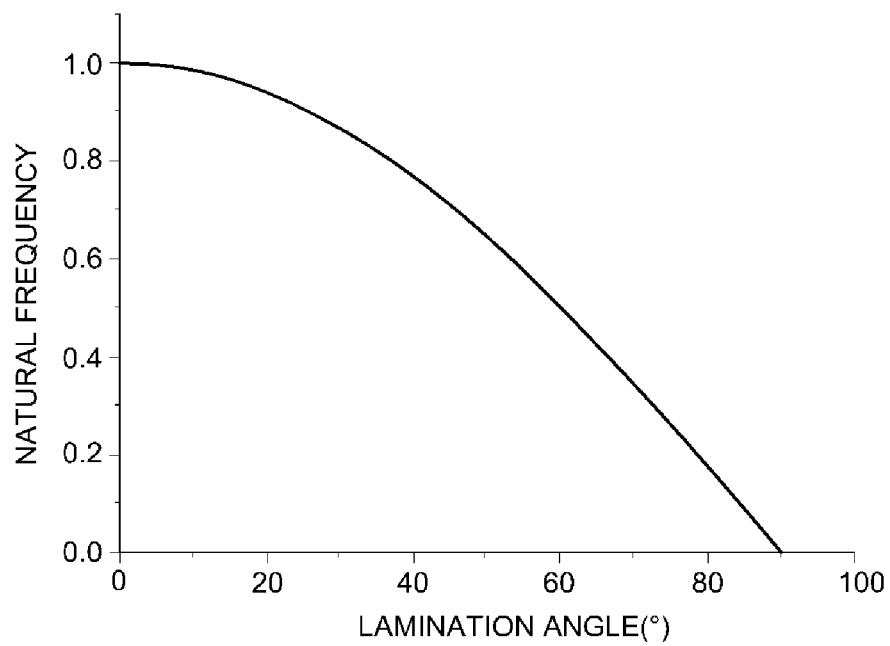
FIG. 13 is a graph illustrating natural frequencies of the propeller shaft with respect to carbon fiber lamination angles.

In the instant case, considering that a factor which needs to be most preferentially considered in respect of design of the propeller shaft is the natural frequency, the largest natural frequency value may be obtained when the wrapping direction of the CFRP and the diameter direction of the tube are coincident with each other (0°), as illustrated in the attached FIG. 13, that is, when the tube is configured by wrapping the CFRP at 0°.

Because a bending load applied to the propeller shaft becomes higher toward the outside layer of the propeller shaft, it is effective to apply the CFRP, which is wrapped in a 0° direction, to the outside layer rather than the inside layer when the CFRP tube layer is configured by laminating the inside layer and the outside layer by using the prepreg wrapping process method.

Figure 14:
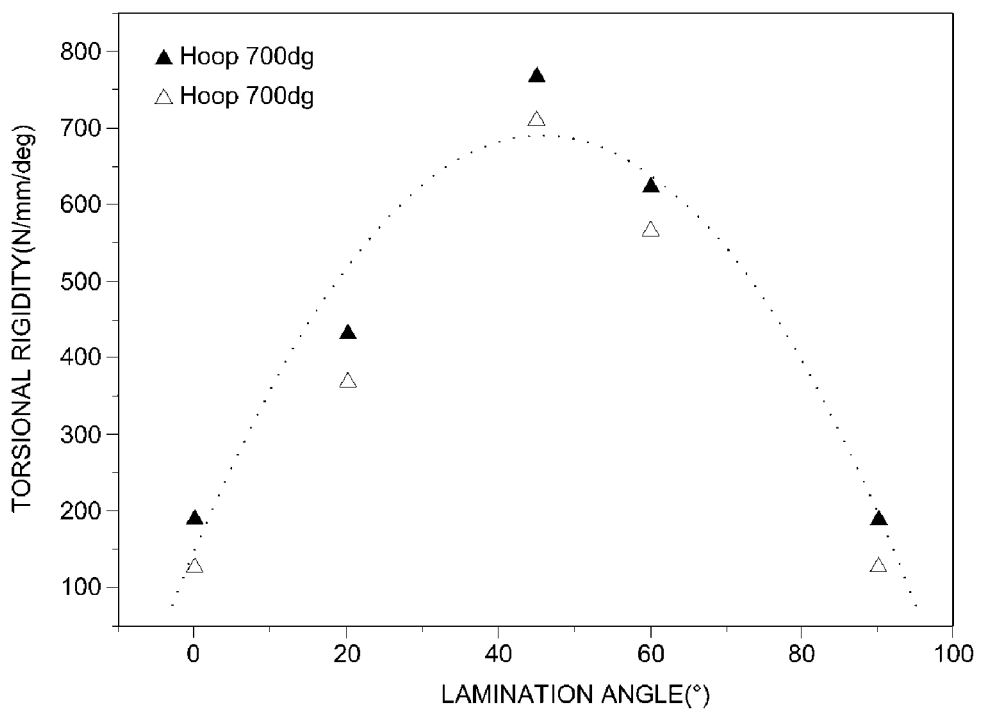
FIG. 14 is a graph illustrating torsional rigidity of the propeller shaft with respect to the carbon fiber lamination angles.

Considering that the torsional rigidity is also an important factor in respect of design of the propeller shaft, the largest torsional rigidity value may be obtained when the tube is configured by wrapping the CFRP at 45° as illustrated in the attached FIG. 14.

Here, the present invention will be described in more detail with reference to the exemplary embodiments.

Various Exemplary Embodiments

The FIG. 1 is a cross-sectional view illustrating various exemplary embodiments of the propeller shaft according to an exemplary embodiment of the present invention which is manufactured by using high-elasticity CFRP.

As illustrated in FIG. 1, the propeller shaft according to the various exemplary embodiments of the present invention includes a CFRP tube layer 10 which includes an outside layer 12 and an inside layer 14, and a protective layer 20 which is formed on the outside layer 12, which is an outermost layer of the CFRP tube layer 10. The CFRP tube layer 10 includes being configured such that the outside layer 12 and the inside layer 14 are laminated on each other by wrapping the high-elasticity CFRP material by using the prepreg wrapping process method.

First, after the inside layer 14 is formed by wrapping the high-elasticity CFRP at 45° by using the prepreg wrapping process method, the outside layer 12 is formed by wrapping the high-elasticity CFRP, which is the same material, at 0° around an outside surface of the inside layer 14 by using the prepreg wrapping process method again, such that the high-elasticity CFRP tube layer 10 in which the outside layer 12 and the inside layer 14 are laminated on each other is manufactured.

Since the outside layer 12 of the CFRP tube layer 10 is configured by wrapping the high-elasticity CFRP at 0°, it is possible to increase the natural frequency as described above with reference to FIG. 13. Further, since the inside layer 14 is configured by wrapping the high-elasticity CFRP at 45°, it is possible to increase the torsional rigidity as described above with reference to FIG. 14.

A thickness ratio between the outside layer 12 in which the high-elasticity CFRP is wrapped at 0° and the inside layer 14 in which the high-elasticity CFRP is wrapped at 45° is determined as 70%:30%.

The reason why the thickness ratio is determined as 70%:30% is that the thickness ratio is a thickness ratio which may satisfy an elastic modulus value and exhibit the highest natural frequency by using only the high-elasticity CFRP when the propeller shaft requires a shear modulus value of 25 GPa or more under a high driving torque environment based on a size of the tube (e.g., 1, 200 mm×80 mm×3 mm).

Next, the protective layer 20 is formed to surround a surface of the outside layer 12 which is the outermost layer of the CFRP tube layer 10.

In the instant case, the protective layer 20 formed on the outermost layer of the CFRP tube layer 10 is configured as a fabric layer formed by fiberizing the thermoplastic super engineering plastic (e.g., polyphenylene sulfide (PPS)) having heat resistance, chemical resistance, and impact resistance.

Therefore, when the protective layer 20, that is, the PPS fabric layer is formed on the outermost layer of the CFRP tube layer, it is possible to increase a fiber content by discharging a resin in the CFRP tube layer to the outside through thermal contraction, and as a result, it is possible to obtain a dimensional stability effect, and after the protective layer 20 is formed, the protective layer 20 serves to protect the CFRP tube layer from an external impact and a severe driving environment.

As a method of forming the protective layer, that is, the PPS fabric layer on the outermost layer of the CFRP tube layer, an operation of wrapping the carbon fiber prepreg layer for forming the CFRP tube layer is completed, and thereafter, the PPS fabric, which has a taping shape (having a width of 7 to 8 cm), is wound upward diagonally around the outside of the carbon fiber prepreg layer from one end portion to the other end portion, surrounding the entire tube with the PPS fabric.

Meanwhile, the meaning that it is possible to increase a fiber content by discharging a resin in the CFRP tube layer to the outside through thermal contraction when the protective layer 20, that is, the PPS fabric layer is formed on the outermost layer of the CFRP tube layer will be described below.

To form the CFRP tube, the tube surrounded by the PPS fabric layer is put into an oven and then cured at a high temperature, and in the instant case, the resin of the carbon fiber prepreg, which forms the semi-cured CFRP tube layer, has fluidity as a temperature is increased, and the PPS fabric is thermally contracted due to the nature of a material thereof, such that it is possible to expect an effect of pressing out the resin having fluidity through thermal contractile force.

Therefore, since the resin is discharged by escaping from gaps between the PPS fabric layers wound upward diagonally, it is possible to inhibit the resin from remaining in the CFRP tube layer more than necessary, and as a result, it is possible to increase the fiber content in the CFRP tube layer.

For reference, as shown in the following Table 1, the high-elasticity CFRPmeans a material reinforced with a high-elasticity carbon fiber having a much larger rigidity value (GPa), that is, a much larger elastic modulus value than steel, aluminum, glass fiber, and the like, and the high-strength CFRP means a material reinforced with a high-strength carbon fiber having a much higher strength value (MPa) than steel, aluminum, glass fiber, and the like.

TABLE 1

|  | Steel | Aluminum | Glass Fiber | High-Strength Carbon Fiber | High-Elasticity Carbon Fiber |
|---|---|---|---|---|---|
| Strength Value (MPa) | 1300 | 570 | 3800 | 4900 | 2600 |
| Rigidity Value (GPa) | 210 | 70 | 75 | 240 | 640 |

Figure 5:
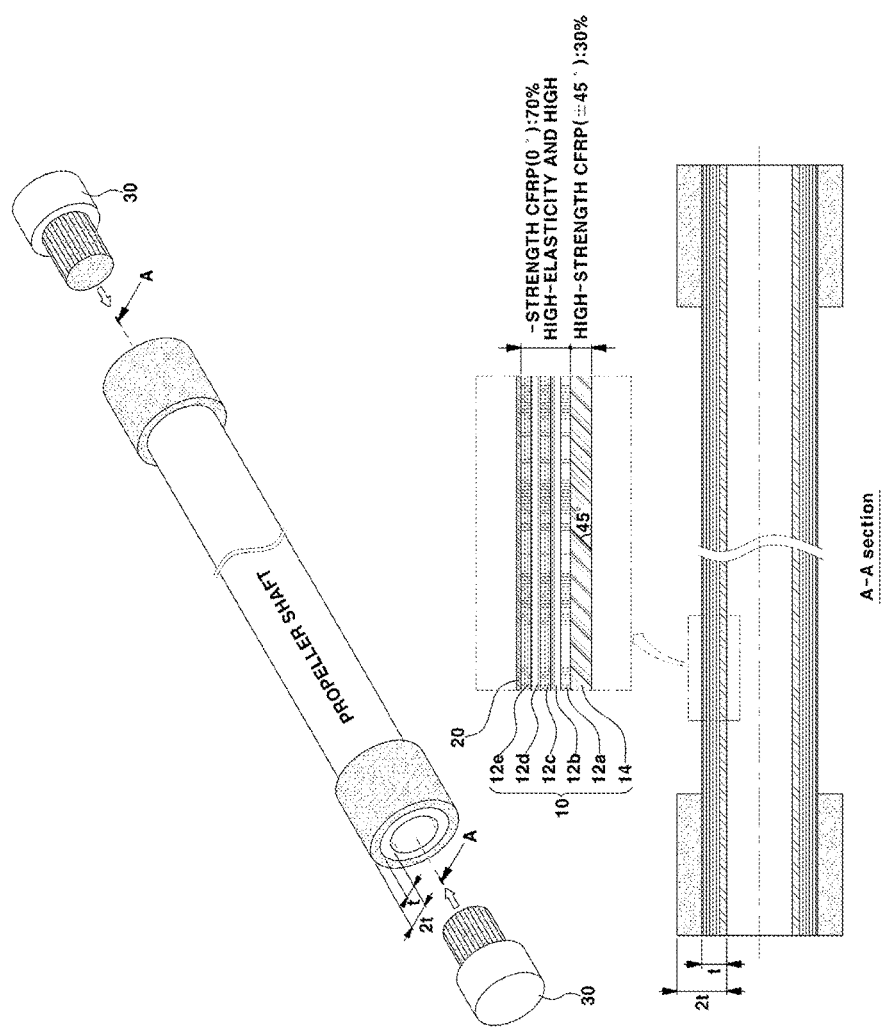
FIG. 5 is a view illustrating a state in which metal yokes are assembled to the propeller shaft according to an exemplary embodiment of the present invention.
Figure 6:
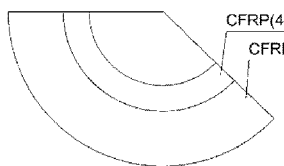
FIG. 6, FIG. 7, FIG. 8, and FIG. 9 are views illustrating physical property test results according to the first to various exemplary embodiments of the present invention.
Figure 7:
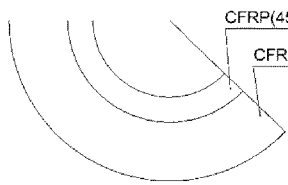
Figure 8:
Figure 9:
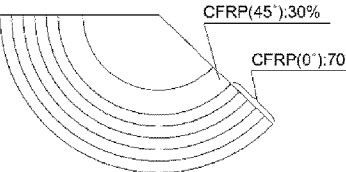

Meanwhile, as illustrated in FIG. 5, metal yokes 30 having serrations are press-fitted into and adhered to both end portions (portions reinforced by the 90° high-strength CFRP) of the CFRP tube layer 10 by using an adhesive, and as a result, the propeller shaft according to the various exemplary embodiments of the present invention is completely manufactured.

Various Exemplary Embodiments

Figure 2:
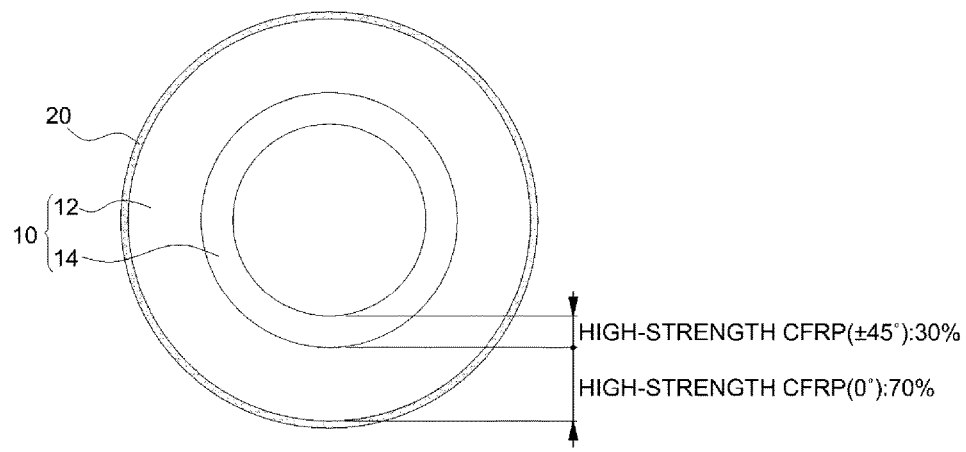
FIG. 2 is a cross-sectional view illustrating a propeller shaft according to various exemplary embodiments of the present invention.

FIG. 2 is a cross-sectional view illustrating various exemplary embodiments of the propeller shaft according to an exemplary embodiment of the present invention which is manufactured by using high-strength CFRP.

As illustrated in FIG. 2, the propeller shaft according to the various exemplary embodiments of the present invention includes having the same laminating configuration as the various exemplary embodiments, and using the high-strength CFRP instead of the high-elasticity CFRP.

As illustrated in FIG. 2, the propeller shaft according to the various exemplary embodiments of the present invention includes a CFRP tube layer 10 which includes an outside layer 12 and an inside layer 14, and a protective layer 20 which is formed on the outside layer 12, which is an outermost layer of the CFRP tube layer 10. The CFRP tube layer 10 includes being configured such that the outside layer 12 and the inside layer 14 are laminated on each other by wrapping the high-strength CFRP material by using the prepreg wrapping process method.

First, after the inside layer 14 is formed by wrapping the high-strength CFRP at 45° by using the prepreg wrapping process method, the outside layer 12 is formed by wrapping the high-strength CFRP, which is the same material, at 0° around an outside surface of the inside layer 14 by using the prepreg wrapping process method again, such that the high-strength CFRP tube layer 10 in which the outside layer 12 and the inside layer 14 are laminated on each other is manufactured.

Since the outside layer 12 of the CFRP tube layer 10 is configured by wrapping the high-strength CFRP at 0°, it is possible to increase the natural frequency as described above with reference to FIG. 13. Further, since the inside layer 14 is configured by wrapping the high-strength CFRP at 45°, it is possible to increase the torsional rigidity as described above with reference to FIG. 14.

A thickness ratio between the outside layer 12 in which the high-strength CFRP is wrapped at 0° and the inside layer 14 in which the high-strength CFRP is wrapped at 45° is determined as 70%:30%.

The reason why the thickness ratio is determined as 70%:30% is that the thickness ratio indicates a thickness ratio which may satisfy a shear modulus value and exhibit the highest natural frequency when forming the tube by using only the high-strength CFRP when the propeller shaft requires a shear modulus value of 10 GPa or more under a driving torque environment based on a size of the tube (1, 200 mm×80 mm×3 mm).

Next, the protective layer 20 is formed to surround a surface of the outside layer 12 which is the outermost layer of the CFRP tube layer 10.

As described in the various exemplary embodiments, the protective layer 20 is configured as a fabric layer formed by fiberizing thermoplastic super engineering plastic (e.g., polyphenylene sulfide (PPS)) having heat resistance, chemical resistance, and impact resistance.

Likewise, as illustrated in FIG. 5, metal yokes 30 having serrations are press-fitted into and adhered to both end portions (portions reinforced by the 90° high-strength CFRP) of the CFRP tube layer 10 by using an adhesive, and as a result, the propeller shaft according to the various exemplary embodiments of the present invention is completely manufactured.

Various Exemplary Embodiments

Figure 3:
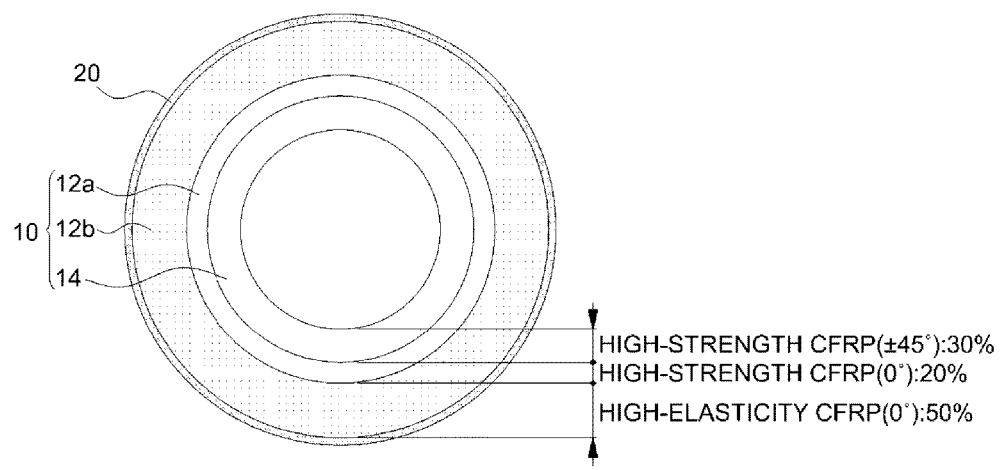
FIG. 3 is a cross-sectional view illustrating a propeller shaft according to various exemplary embodiments of the present invention.

FIG. 3 is a cross-sectional view illustrating various exemplary embodiments of the propeller shaft according to an exemplary embodiment of the present invention which is manufactured by using high-strength CFRP and high-elasticity CFRP.

As illustrated in FIG. 3, the propeller shaft according to the various exemplary embodiments of the present invention includes a CFRP tube layer 10 which includes first and second outside layers 12a and 12b and an inside layer 14, and a protective layer 20 which is formed on the second outside layer 12b which is an outermost layer of the CFRP tube layer 10.

In the instant case, the inside layer 14 of the CFRP tube layer 10 is configured by wrapping the high-strength CFRP, and the first outside layer 12a and the second outside layer 12b are configured by wrapping the high-strength CFRP and the high-elasticity CFRP, respectively, by the prepreg wrapping process method, and being laminated on each other.

First, after the inside layer 14 is formed by wrapping the high-strength CFRP at 45° by using the prepreg wrapping process method, the first outside layer 12a is formed by wrapping the high-strength CFRP, which is the same material, at 0° around an outside surface of the inside layer 14 by using the prepreg wrapping process method again, and then the second outside layer 12b is formed by wrapping the high-elasticity CFRP at 0° around an outside surface of the first outside layer 12a by using the prepreg wrapping process method again, such that the CFRP tube layer 10 in which the first outside layer 12a and the second outside layer 12b are sequentially laminated on the inside layer 14 is manufactured.

Since the first and second outside layers 12a and 12b of the CFRP tube layer 10 are configured by wrapping the high-strength CFRP and the high-elasticity CFRP at 0°, respectively, it is possible to increase the natural frequency as described above with reference to FIG. 13. Further, since the inside layer 14 is configured by wrapping the high-strength CFRP at 45°, it is possible to increase the torsional rigidity as described above with reference to FIG. 14.

A thickness ratio among the second outside layer 12b in which the high-elasticity CFRP is wrapped at 0°, the first outside layer 12a in which the high-strength CFRP is wrapped at 0°, and the inside layer 14 in which the high-strength CFRP is wrapped at 45° is determined as 50%: 20%:30%.

The reason why the thickness ratio is determined as 50%:20%:30% is that the thickness ratio indicates a thickness ratio which may satisfy a shear modulus value and exhibit the highest natural frequency by using both of the high-elasticity CFRP and the high-strength CFRP when the propeller shaft requires a shear modulus value of 10 GPa or more under a driving torque environment based on a size of the tube (1, 200 mm×80 mm×3 mm).

Next, the protective layer 20 is formed to surround a surface of the outside layer 12 which is the outermost layer of the CFRP tube layer 10.

As described in the various exemplary embodiments, the protective layer 20 is configured as a fabric layer formed by fiberizing thermoplastic super engineering plastic (e.g., polyphenylene sulfide (PPS)) having heat resistance, chemical resistance, and impact resistance.

Likewise, as illustrated in FIG. 5, metal yokes 30 having serrations are press-fitted into and adhered to both end portions (portions reinforced by the 90° high-strength CFRP) of the CFRP tube layer 10 by using an adhesive, and as a result, the propeller shaft according to the various exemplary embodiments of the present invention is completely manufactured.

Various Exemplary Embodiments

Figure 4:
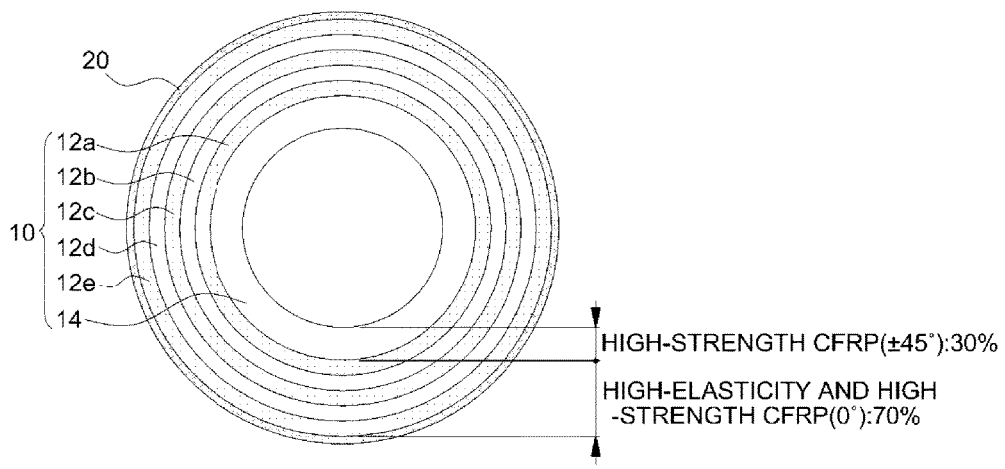
FIG. 4 is a cross-sectional view illustrating a propeller shaft according to various exemplary embodiments of the present invention.

FIG. 4 is a cross-sectional view illustrating various exemplary embodiments of the propeller shaft according to an exemplary embodiment of the present invention which is manufactured by using high-strength CFRP and high-elasticity CFRP.

As illustrated in FIG. 4, the propeller shaft according to the various exemplary embodiments of the present invention includes a CFRP tube layer 10 which includes three or more outer and inside layers, and a protective layer 20 which is formed on an outermost outside layer of the CFRP tube layer 10.

As the outside layers of the CFRP tube layer 10, first to fifth outside layers 12a to 12e are sequentially laminated on a surface of the inside layer 14.

In the instant case, the inside layer 14 of the CFRP tube layer 10 is formed by wrapping the high-strength CFRP by the prepreg process method, and the first to fifth outside layers 12a to 12e are configured to be laminated on one another by alternately wrapping the high-elasticity CFRP and the high-strength CFRP by the prepreg process method.

For example, the first outside layer 12a is formed by wrapping the high-elasticity CFRP, the second outside layer 12b is formed by wrapping the high-strength CFRP, the third outside layer 12c is formed by wrapping the high-elasticity CFRP, the fourth outside layer 12d is formed by wrapping the high-strength CFRP, the fifth outside layer 12e is formed by wrapping the high-elasticity CFRP, and the first to fifth outside layers are laminated on one another.

First, the inside layer 14 is formed by wrapping the high-strength CFRP at 45° by using the prepreg wrapping process method, and then the first to fifth outside layers 12a to 12e are formed by sequentially wrapping the high-elasticity CFRP and the high-strength CFRP at 0° around an outside surface of the inside layer 14 by using the prepreg wrapping process method again, such that the CFRP tube layer 10 in which the first to fifth outside layers 12a to 12e are sequentially laminated on the inside layer 14 is manufactured.

In the instant case, based on an overall thickness of the tube, the thickness of the inside layer 14, which is formed by wrapping the high-strength CFRP at 45°, is determined as 30% of the overall thickness, the thicknesses of the second outside layer 12b and the fourth outside layer 12d, which are formed by wrapping the high-strength CFRP at 0°, are determined as 20%, and the thicknesses of the remaining first, third, and fifth outside layers 12a, 12c, and 12e, which are formed by wrapping the high-elasticity CFRP at 0°, are determined as 50%. The reason is that this thickness ratio indicates a thickness ratio which may satisfy a shear modulus value and exhibit the highest natural frequency by using both of the high-elasticity CFRP and the high-strength CFRP when the propeller shaft requires a shear modulus value of 10 GPa or more under a driving torque environment based on a size of the tube (1, 200 mm×80 mm×3 mm).

Since the first to fifth outside layers 12a to 12e of the CFRP tube layer 10 are configured by wrapping the high-strength CFRP and the high-elasticity CFRP at 0°, it is possible to increase the natural frequency as described above with reference to FIG. 13. Further, since the inside layer 14 is configured by wrapping the high-strength CFRP at 45°, it is possible to increase the torsional rigidity as described above with reference to FIG. 14.

Next, the protective layer 20 is formed to surround a surface of the outside layer 12 which is the outermost layer of the CFRP tube layer 10.

As described in the various exemplary embodiments, the protective layer 20 is configured as a fabric layer formed by fiberizing thermoplastic super engineering plastic (e.g., polyphenylene sulfide (PPS)) having heat resistance, chemical resistance, and impact resistance.

Likewise, as illustrated in FIG. 5, metal yokes 30 having serrations are press-fitted into and adhered to both end portions (portions reinforced by the 90° high-strength CFRP) of the CFRP tube layer 10 by using an adhesive, and as a result, the propeller shaft according to the various exemplary embodiments of the present invention is completely manufactured.

Test Example

The propeller shafts, which were manufactured in accordance with the first to various exemplary embodiments and Comparative Examples 1 to 4, were tested for physical properties (tensile elasticity, shear elasticity, density, natural frequency, and torsional rigidity) by using typical equipment.

In the instant case, physical properties of the propeller shafts according to the first to various exemplary embodiments were tested in a state in which the protective layers of the configurations of the propeller shafts were omitted to easily perform the tests.

The propeller shaft according to Comparative Example 1 was manufactured such that the inside layer includes steel, the first outside layer is configured as a glass fiber layer wrapped at 0°, and the second outside layer is formed by wrapping the high-strength CFRP at 0°.

The propeller shaft according to Comparative Example 2 was manufactured such that the inside layer includes aluminum, the first outside layer is configured as a glass fiber layer wrapped at 0°, and the second outside layer is formed by wrapping the high-strength CFRP at 0°.

The propeller shaft according to Comparative Example 3 was manufactured by winding the high-strength CFRP at 15° by using a filament winding process method.

The test results according to the first to various exemplary embodiments and Comparative Examples 1 to 3 are shown in FIGS. 6 to 12.

Figure 10:
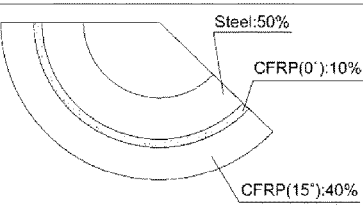
FIG. 10, FIG. 11, and FIG. 12 are views illustrating physical property test results according to a Comparative Example.
Figure 11:
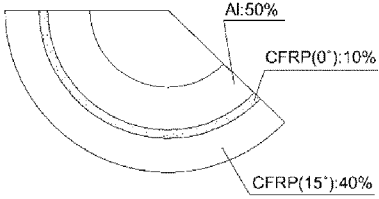
Figure 12:
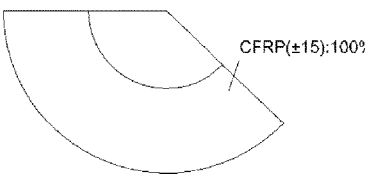

It can be seen that the natural frequency and the torsional rigidity as well as the tensile elasticity of the propeller shafts according to the respective exemplary embodiments of the present invention (see tables in FIGS. 6 to 9) are higher than the natural frequency and the torsional rigidity as well as the tensile elasticity of the propeller shafts according to Comparative Examples 1 to 3 (see tables in FIGS. 10 to 12).

As illustrated in FIG. 5, CFRP wrapping may be further performed at 90° two times as much as a tube thickness at both end portions of the CFRP to prevent damage to the tube layer caused by press-fitting force of the metal yokes which are press-fitted into the both end portions of the CFRP tube layer.

As described above, the present invention may provide the propeller shaft which includes the CFRP tube layer in which two or more layers are laminated at different wrapping angles by using the advantage of the prepreg wrapping process method which is not limited in respect of the lamination angle, and the protective layer which is formed on the outermost layer of the CFRP tube layer to protect the CFRP tube layer, maximizing the natural frequency and the torsional rigidity.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hybrid propeller shaft for a vehicle, the hybrid propeller shaft comprising:
   a CFRP (Carbon Fiber Reinforced Plastic) tube layer in which, a high-strength CFRP, and a high-elasticity CFRP are laminated to form at least two layers while having different wrapping angles by a prepreg wrapping process method; and
   a protective layer which is formed on an outermost layer of the CFRP tube layer to protect the CFRP tube layer,
   wherein the CFRP tube layer includes an inside layer which is formed by wrapping the high-strength CFRP at 45° by using the prepreg wrapping process method, and first to fifth outside layers which are formed by sequentially wrapping the high-elasticity CFRP and the high-strength CFRP at 0° around an outside surface of the inside layer by using the prepreg wrapping process method again, and
   wherein a thickness of the high-strength CFRP, which forms the inside layer, is determined as 30% of an overall thickness of the CFRP tube layer, a thickness of the high-strength CFRP, which forms the second and fourth outside layers, is determined as 20% of the overall thickness, and a thickness of the high-elasticity CFRP, which forms the remaining first, third, and fifth outside layers, is determined as 50% of the overall thickness, and
   wherein the high-elasticity CFRP has higher elasticity compared to the high-strength CFRP, and the high-strength CFRP has higher strength compared to the high-elasticity CFRP.

2. The hybrid propeller shaft of claim 1, wherein the protective layer is configured as a fabric layer formed by fiberizing polyphenylene sulfide (PPS) which is a kind of thermoplastic super engineering plastic.

3. The hybrid propeller shaft of claim 1, wherein metal yokes are press-fitted into and fastened to first and second end portions of the CFRP tube layer by splines.

4. The hybrid propeller shaft of claim 1, wherein CFRP wrapping is further performed twice as much as a tube thickness at first and second end portions of the CFRP tube layer.

* * * * *